United States Patent [19]

Cote et al.

[11] Patent Number: 4,742,984
[45] Date of Patent: May 10, 1988

[54] ATTACHING ARRANGEMENT FOR VEHICLE SEAT CUSHION

[75] Inventors: Janice E. Cote, Ann Arbor; Donald L. Silsbe, Woodhaven, both of Mich.

[73] Assignee: Chrysler Motors Corporation, Highland Park, Mich.

[21] Appl. No.: 77,272

[22] Filed: Jul. 24, 1984

[51] Int. Cl.⁴ .............................................. F16M 13/00
[52] U.S. Cl. .................................. 248/503.1; 24/662; 248/27.3; 248/221.4; 297/452
[58] Field of Search .............. 248/503.1, 221.3, 221.4, 248/27.3; 297/452; 24/662, 664

[56] References Cited

U.S. PATENT DOCUMENTS

| 2,943,373 | 7/1960 | Rapata | 24/662 |
| 2,946,612 | 7/1960 | Ahlgren | 24/662 X |
| 3,164,054 | 1/1965 | Biesecker | 24/662 |
| 3,374,979 | 3/1968 | Coldren et al. | 248/221.4 |
| 3,899,151 | 8/1975 | Kobrehel | 248/429 |
| 3,915,493 | 10/1975 | Brown | 297/452 X |
| 3,961,767 | 6/1976 | Albrecht et al. | 248/503.1 |
| 4,580,322 | 4/1986 | Wright et al. | 24/662 |

FOREIGN PATENT DOCUMENTS 1574372 9/1980 United Kingdom ............ 248/503.1

Primary Examiner—David L. Talbott
Attorney, Agent, or Firm—Edward P. Barthel

[57] ABSTRACT

A seat cushion is mounted as a vehicle floor panel by a plastic anchor member adapted to be snap-fitted into position in a panel aperture by means of locking fingers. The anchor member has an oval-sectioned tubular open-ended body with the interior of its side walls formed with parallel mutually opposed pairs of ribs defining a pair of spaced upwardly open V-shaped notches. Each pair of ribs have their lower ends interconnected by mutually opposed base flanges defining therebetween an elongated gap. The base flange undersurfaces are sloped upwardly providing an inverted V-shaped locking catch. The catch is adapted to capture the striker upon it being forcefully pushed downwardly into the V-notches allowing the striker to snappingly pass through the gap.

1 Claim, 2 Drawing Sheets

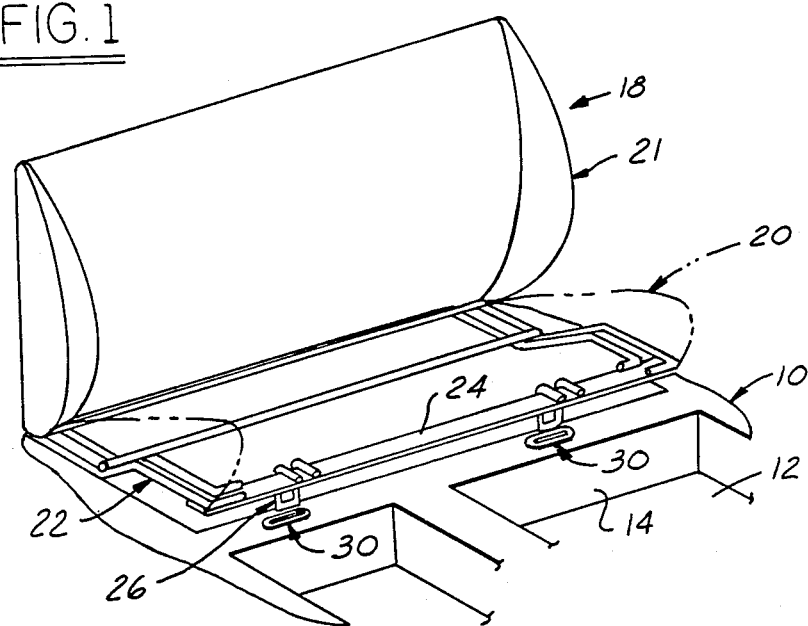
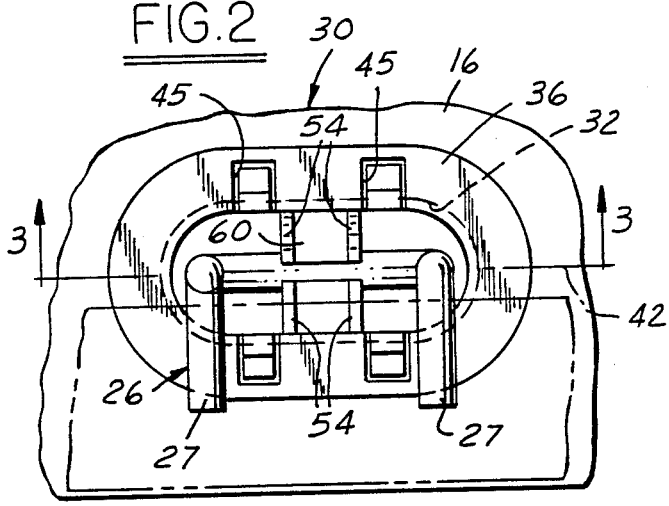
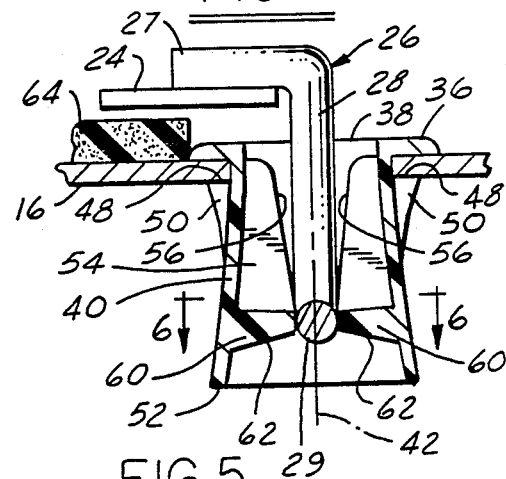
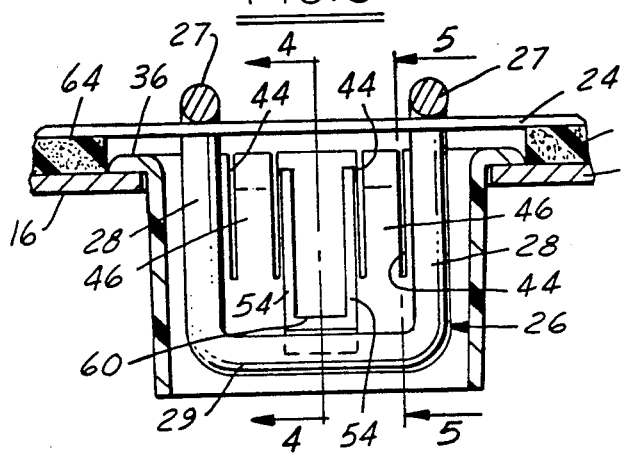
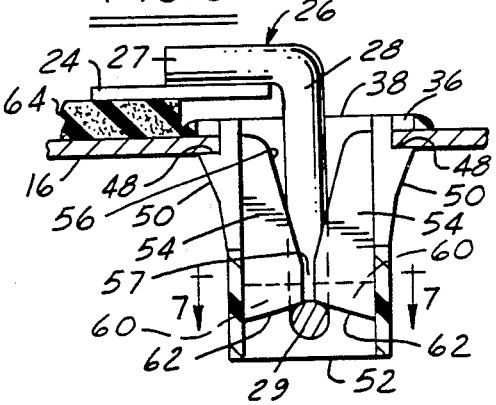

ATTACHING ARRANGEMENT FOR VEHICLE SEAT CUSHION

This invention relates generally to attachment devices for vehicle seats and more particularly to such an arrangement that utilizes a striker and plastic anchor member in combination for readily securing a rear seat cushion to the vehicle body.

BACKGROUND OF THE INVENTION

Various arrangements have heretofore been used for securing the seat cushion of an automobile to the vehicle body. For example, the U.S. Pat. No. 3,899,151 discloses a vehicle seat attachment device wherein a seat adjuster is received in an upwardly opening slot of a mounting bracket. The U.S. Pat. No. 3,961,767 discloses another vehicle seat mounting apparatus including an anchor bracket mounted on the vehicle floor adapted to receive into one side thereof a locator bracket operatively connected to the seat adjustment track.

SUMMARY OF THE INVENTION

A primary object of the present invention is to provide an improved quick connect mounting means for an automotive seat cushion, including anchor members adaptable to be snap-fitted into position in associated floor panel apertures by means of locking fingers. The anchor members have an oval-sectioned tubular open-ended body molded of flexible plastic material and sized for bounding the wall apertures. The interior side walls are each formed with a pair of parallel mutually opposed ribs defining a pair of upwardly opening V-shaped notches. Each pair of ribs have their lower ends joined by a base flange defining therebetween a uniform elongated gap. The V-shaped notches of each anchor member are adapted to receive a U-shaped striker extending downwardly frame a supporting portions of a seat cushion frame. Upon the striker being forcefully pushed downwardly into the V-shaped notches a wedging action causes the tubular body lower open end to resiliently expand allowing the striker to pass through the gap. The striker is captured by snapping it in an inverted V-shaped locking catch formed by the base flange undersurfaces which are each slanted upwardly toward the interior of the tubular body. It is thus a feature of the present invention to provide anchor members wherein no tools are required for installation.

Another feature of the invention is to provide an anchor member as set forth above having a locking arrangement which absorbs any vibrations applied to the attachment device which may cause rattling sounds. The anti-vibration feature is achieved by providing resilient padding on the underside of the cushion frame. The striker members extend downwardly from the frame a predetermined distance such that upon being snappingly captured in their associated anchors, the padding material is compressed between the cushion frame and the vehicle floor biasing the striker into its inverted V-shaped catch thereby dampening out vibrations to which the seat is subjected.

BRIEF DESCRIPTION OF THE DRAWINGS

The objects, features and advantages of the present invention are readily apparent from the following detailed description of the best mode taken in conjunction with the accompanying drawings in which:

FIG. 1 is a a partial front perspective view of a vehicle having a rear seat cushion attachment arrangement according to this invention;

FIG. 2 is an enlarged fragmentary top elevation view of one of the attachment arrangements of FIG. 1;

FIG. 3 is a fragmentary vertical sectional view taken substantially on the line 3—3 of FIG. 2;

FIG. 4 is a fragmentary vertical sectional view taken substantially on the line 4—4 of FIG. 3 showing the striker partially inserted in the anchor;

FIG. 5 is a fragmentary vertical sectional view taken on the line 5—5 of FIG. 3 showing the striker in the locked position;

DETAILED DESCRIPTION OF THE PREFERRED EMBODIMENT

Figure 6:
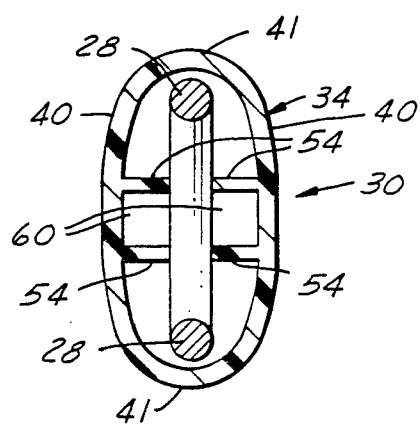
FIG. 6 is a horizontal sectional view taken on the line 6—6 of FIG. 4.

Referring now particularly to FIG. 1 of the drawing, a vehicle 10 includes a floor pan 12 which includes a rear kickup area having angled vertical wall 14 and an intermediate generally horizontal floor panel 16. The floor pan 12 is conventional and forms no part of this invention. A vehicle rear seat indicated generally at 18 includes a seat cushion 20 and a back rest 21 of conventional structure. The seat cushion 20 includes a frame 22 having a front transverse frame member 24.

A pair of U-shaped strikers 26 are each formed with a pair of horizontally extending right angled fingers 27 welded to the upper surface of the frame member 24. Each striker has a pair of legs 28 extending vertically downwardly from its fingers 27 terminating in a transverse bight portion 29 adapted to be lockingly received in an anchor or retainer member, generally indicated at 30. The anchor member is snugly received in an elongated oval-shaped aperture 32 extending through in the panel 16. While the striker and anchor member combination disclosed herein offers particular advantages when utilized in paired installations for seat mounting it is to be appreciated that such striker anchor mountings might be used singly or in multiple combinations other than as illustrated.

Figure 7:
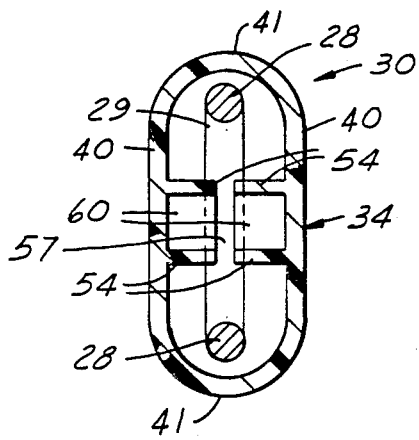
FIG. 7 is a horizontal sectional view taken on the line 7—7 of FIG. 5.

Turning now to FIGS. 2-8 the anchor member 30 includes a substantially tubular open-ended body portion 34 molded of a suitable flexible plastic material. The body portion upper end is formed with a retaining collar portion 36 extending horizontally around the periphery of the body portion upper open end 38. As best seen in FIG. 7, the body portion 34 normally has an oval-shape in horizontal section defining parallel planar side wall portions 40 interconnected by arcuate half-round end wall portions 41. It will be noted that the anchor member 30 is formed symmetrical about a vertically disposed longitudinally extending plane of symmetry indicated by dashed construction line 42 in FIGS. 2 and 4.

Figure 8:
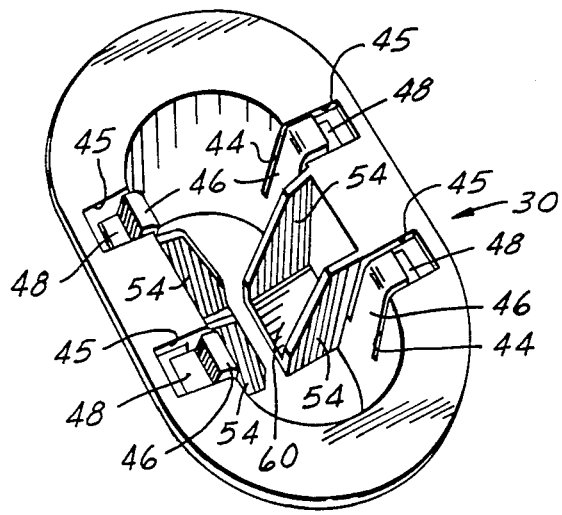
FIG. 8 is an enlarged perspective view of the anchor as viewed from its upper end.
Figure 9:
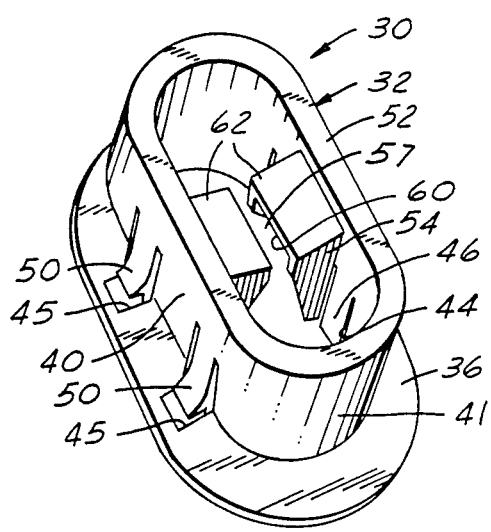
FIG. 9 is an enlarged perspective view of the anchor as viewed from its lower end.

As best seen in FIGS. 2, 3 and 8 each side wall portion 40 has a pair of vertically disposed mutually opposed cutouts 44. The cutouts 44 have their upper closed ends terminating in horizontally disposed slot portions 45 formed in the collar 36. It will be noted in FIG. 3 that the vertically disposed cutouts 44 extend about one-half the overall height of the anchor member body portion 34.

The two spaced cutouts 44 in each side wall define a pair of mutually opposed vertically extending spring locking fingers 46. As seen in FIG. 4, each locking finger is formed with an outwardly projecting shoulder 48 on its outer surface. The shoulders 48 each have an outer surface 50 that slopes inwardly toward lower open end 52 of the body portion 32. Thus, upon the anchor member body portion being inserted in its elongated oval-shaped wall aperture 32 the aperture opposing side edges will engage the outer sloped surface 50 of each of the shoulders 48 and flex the locking fingers inwardly. Upon the anchor member collar portion 36 contacting the upper surface of the floor panel 16 the shoulder sloped surfaces will be released. This allows the fingers 46 to snap outwardly locking the anchor member 30 in the aperture 32 by virtue of the shoulders 48 engaging the underside of the panel 16.

FIG. 2 shows the inner surface of each side wall portion 40 of the anchor member formed with a pair of vertically extending spaced apart mutually opposed pair of ribs 54. Each rib 54 has an edge ramp 56 sloped downwardly and inwardly toward the plane of symmetry 42 so as to define with its mutually opposed rib a pair of V-shaped lead-in notches. The resultant pair of V-shaped notches terminate in a longitudinally extending slotted opening or elongated gap 57 defined by vertically extending opposed edge portions 58 of a base flange 60. Each pair of mutually opposed ribs 54 have their lower ends joined by a wedge sectioned base flange portion 60 formed integral with and extending inwardly from one side wall portion 40. The base flanges 60 have their undersurfaces 62 sloped upwardly toward the elongated gap 57 defining a shallow inverted V-shaped locking catch adapted to capture the striker transverse bight portion 29 at its apex.

As best seen in FIG. 4, the elongated gap 57 has a predetermined transverse dimension sized to normally prevent the passage of the striker bight portion 29 therethrough. With reference to FIG. 4, the striker bight portions 29 are initially received in their associated anchor member V-shaped lead-in notches for guided engagement with its pair of ramp sloped edges 56. Each striker bight portion 29 is forcefully pushed downwardly resulting in a wedging action. As seen in FIG. 6, this action causes the body portion lower end 52 oval-shaped opening to deform outwardly or expand from the plane of symmetry, defined by construction line 42. As a result, the elongated gap 57 widens allowing the striker bight portion 29 to pass therethrough so as to be snappingly captured in the inverted V-shaped locking catch defined by sloped undersurfaces 62.

It will be noted in FIG. 4 that a layer of resilient upholstery material, such as foam rubber padding 64 having a predetermined minimal thickness, is provided on the upper surface of the floor panel 16 and adapted to contact the underside of the cushion forward transverse frame member 24. The striker member legs 28 are designed to extend downwardly from the transverse frame member 24 a predetermined distance. Thus, upon each striker member bight portion 29 being snappingly captured in its associated inverted V-shaped catch, defined by surfaces 62, the foam rubber padding material 64 is compressed between the transverse member 24 and the vehicle floor panel 16. The resultant compressive force acts to resiliently biases the striker horizontal bight portion 29 into its inverted V-shaped catch thereby dampening out vibrations to which the seat is subjected.

Although only one embodiment of the subject invention has been illustrated and described, modifications and variations of the invention will readily come to mind of a person skilled in the art which modifications and variations do not fall outside the scope of the invention as defined hereinafter.

What is claimed is:

1. In combination with a vehicle floor panel, an attaching arrangement securing a seat cushion frame to said vehicle floor panel, said attaching arrangement comprising; a U-shaped striker having a pair of longitudinally spaced legs depending vertically downwardly from said frame and terminating in a horizontally disposed elongated bight portion, said floor panel having an elongated oval-shaped aperture therethrough defined by parallel side edges joined at each end by arcuate end edges, a one piece anchor member molded of flexible plastic material wherein said anchor member is symmetrical about a vertically disposed longitudinally extending plane, said anchor member having a susbstantially tubular shaped opened body portion formed with a continuous outwardly directed retaining collar portion on the upper open end thereof, said body portion normally having an oval-shape in horizontal section defining parallel planar opposed wall portions being interconnected at each longitudinal extremity by arcuate end wall portions, said elongated bight portion having a longitudinal extent greater than the longitudinal extent of said planar opposed wall portions but less than said open-ended body portion, said body portion horizontal section conforming to the shape of said floor panel aperture for snug reception therein, each said side wall portion having a pair of parallel elongated cut-outs extending vertically from said upper collar portion a predetermined distance at least one-half the overall height of said body portion defining a pair of spaced vertically disposed spring locking fingers, each said cut-out having its upper closed end terminating in a horizontally disposed slot portion formed in said collar portion into which the free upper end of its associated locking finger extends, each said locking finger being formed with an outwardly projecting horizontally disposed shoulder, each said shoulder having an outer surface that slopes toward said body portion lower open end, such that upon said anchor member body portion being inserted in said floor panel aperture its each side edge engaging its associated pair of shoulder outer sloped surfaces thereby flexing each said locking finger inwardly, whereby upon said collar portion contacting the upper surface of said floor panel each said shoulder sloped surface being released allowing said fingers to snap outwardly whereby the floor panel aperture bounding edge is locked between each said finger horizontally disposed shoulder and the underside of said collar portion thereby locking said anchor member in said aperture, each said side wall inner surface formed with a pair of vertically extending parallel ribs having mutually opposed ramp edges that slope downwardly and inwardly toward said plane of symmetry defining a pair of longitudinally spaced lead-in V-shaped notches, each said pair of ribs symmetrically disposed on one said side wall portion intermediate its associated pair of spring finger cut-outs, each said pair of ribs joined at their lower ends in opposed wedge-shaped base flange portions defining therebetween a longitudinally extending elongated gap having a predetermined transverse dimension normally preventing the passage of said striker bight portion therethrough, said base flange portions each having their undersurface sloped upwardly toward said gap defining a shallow inverted V-shaped locking catch adapted to capture said striker bight portion, whereby upon said striker bight portion being received in said pair of V-shaped notches and being forcefully pushed downwardly resulting in a wedging action causing said body portion intermediate side wall portions to resiliently deform outwardly from said plane of symmetry at said body portion lower open end thereby expanding said elongated gap and allowing said bight portion to snappingly pass therethrough so as to be captured in said inverted V-shaped locking catch, and wherein a layer of resilient foam rubber material located on said floor panel upper surface, and said U-shaped striker vertically extending leg portions of a predetermined length such that upon said bight portion being captured in said locking catch said resilient material is compressed between said frame and said floor panel upper surface, whereby a resultant spring force exerted by said compressed resilient material acts to resiliently bias said striker elongated bight portion upwardly into said catch thereby dampening out vibrations to which said seat cushion frame is subjected, and with said U-shaped striker removed from said anchor member said horizontally disposed slot portions enabling each opposed pair of said finger free upper end to be grasped and forced inwardly thereby allowing the removal of said anchor member from said floor panel aperture.

* * * * *